Nov. 2, 1965   C. W. ROESCHKE   3,216,010
RANGE INDICATING SYSTEM
Filed Nov. 4, 1952   3 Sheets-Sheet 1

INVENTOR.
C. W. ROESCHKE
BY
*Roland A. Anderson*
ATTORNEY

Nov. 2, 1965  C. W. ROESCHKE  3,216,010
RANGE INDICATING SYSTEM
Filed Nov. 4, 1952                                3 Sheets-Sheet 2

INVENTOR.
C. W. ROESCHKE
BY
Roland A. Anderson
ATTORNEY

Nov. 2, 1965  C. W. ROESCHKE  3,216,010
RANGE INDICATING SYSTEM
Filed Nov. 4, 1952  3 Sheets-Sheet 3

INVENTOR.
C.W. ROESCHKE
BY
ATTORNEY

United States Patent Office 3,216,010
Patented Nov. 2, 1965

3,216,010
RANGE INDICATING SYSTEM
Conrad W. Roeschke, Albuquerque, N. Mex., assignor, by mesne assignments, to the United States of America as represented by the United States Atomic Energy Commission
Filed Nov. 4, 1952, Ser. No. 318,552
7 Claims. (Cl. 343—12)

This invention relates to an improved range indicating system, providing an accuracy of range indication which progressively increases as the range diminishes. Examples of the use of the invention are the cases of an airplane descending toward the sea or land and of a ship approaching a landfall or avoiding a danger. While the invention is particularly useful in a radar system, it is applicable as well to a sonar system.

A general object of the invention is, therefore, to provide an improved range indicating system.

Another object of the invention is to provide a range indicating system of which the accuracy increases with decreasing range.

In the case of a descending airplane or a ship at sea it is desirable to indicate the proximity of a danger, such as the land or ocean surface or a navigation hazard, regardless of visibility conditions. Numerous radar systems exist to serve this purpose, but the present invention makes possible successive automatic indications of range as the danger is approached. A series of pre-selected ranges decreasing progressively by a chosen factor, say two, are chosen in advance, and the attainment of each range may be indicated by the successive actuation of one and another circuit which may give a signal or effect a desired operation.

The provision of such facilities is another object of the invention.

In one application, the invention makes use of a range determining method in which a radar signal modulated in amplitude is transmitted toward a reflecting object and the reflected signal is compared in phase of modulation with the transmitted signal. A related system is that described by Esenchied and Newhouse, "A Terrain Clearance Indicator," published in the Bell System Technical Journal, volume 18, pp. 222–234, January 1939. In that publication there is disclosed a radar signal varied cyclically in frequency, the difference in frequency between transmitted and reflected signals being indicative of the range.

From the description that follows it will be apparent that the present invention provides, when coupled with a phase meter, an altimeter using an amplitude-modulated continuous wave; and the provision of such an altimeter is another object of the invention.

The measurement of range, using either frequency or amplitude modulation, involves ambiguities: in the former case, the number of cycles of frequency modulation between the moment of transmission and the arrival of the reflected signal must be known or less than one; in the latter, the same must be true of the cycles of amplitude modulation. In each case range indication may occur at any altitude which is a whole multiple of a fixed value corresponding to the chosen frequency of modulation.

These ambiguities may be removed for each method if provision is made to double the modulation frequency when the range is halved. This requires a system of apparatus which automatically indicates the attainment of half the range correspondent to the original frequency and simultaneously substitutes double the modulation frequency; similarly, at each later halving of the range.

To provide such a system is another object of the invention.

The attainment of these objects and of others not enumerated will be understood from the following description of an embodiment of the invention as used in a descending airplane, a radar system being chosen for illustration, read with reference to the accompanying drawings in which.

Figure 1:
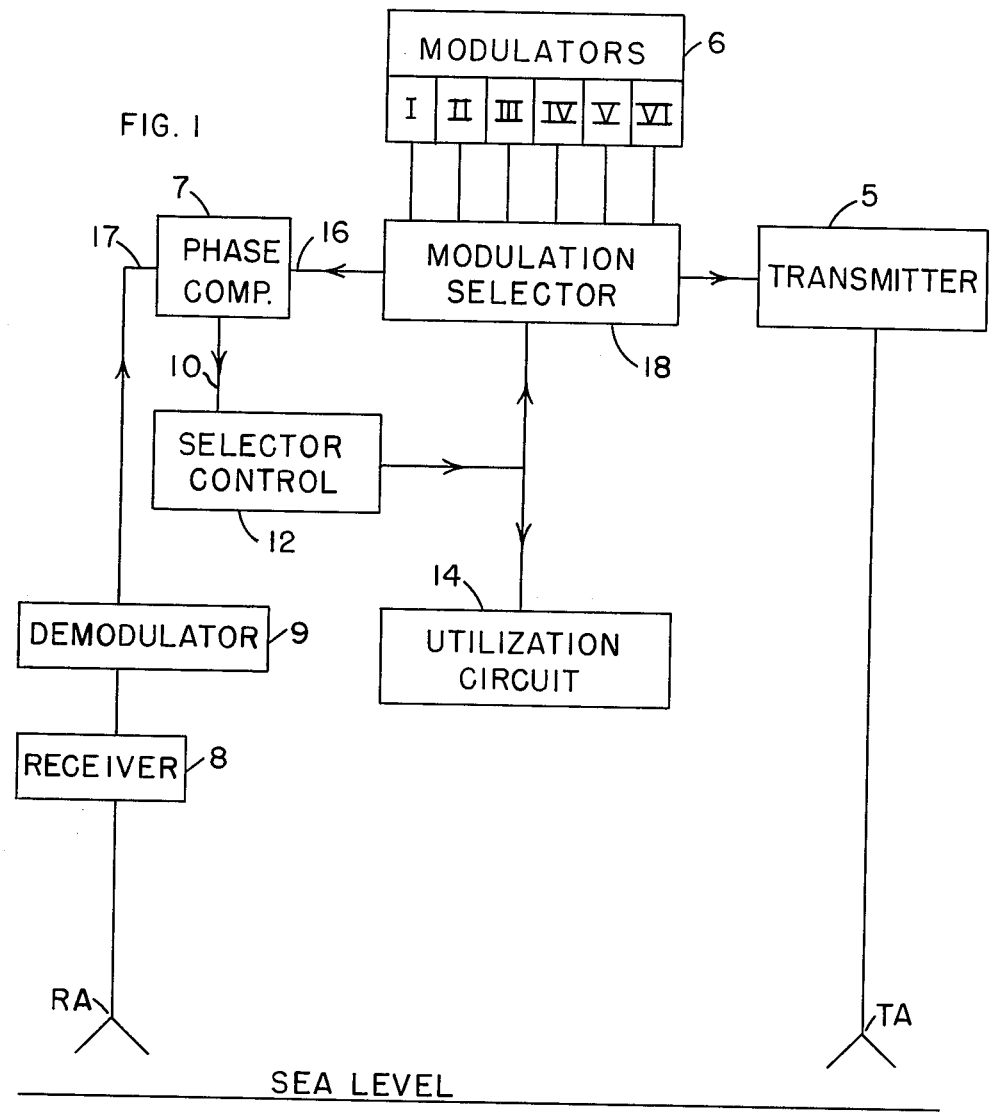
FIG. 1 is a block schematic of the system of the invention.
Figure 2:
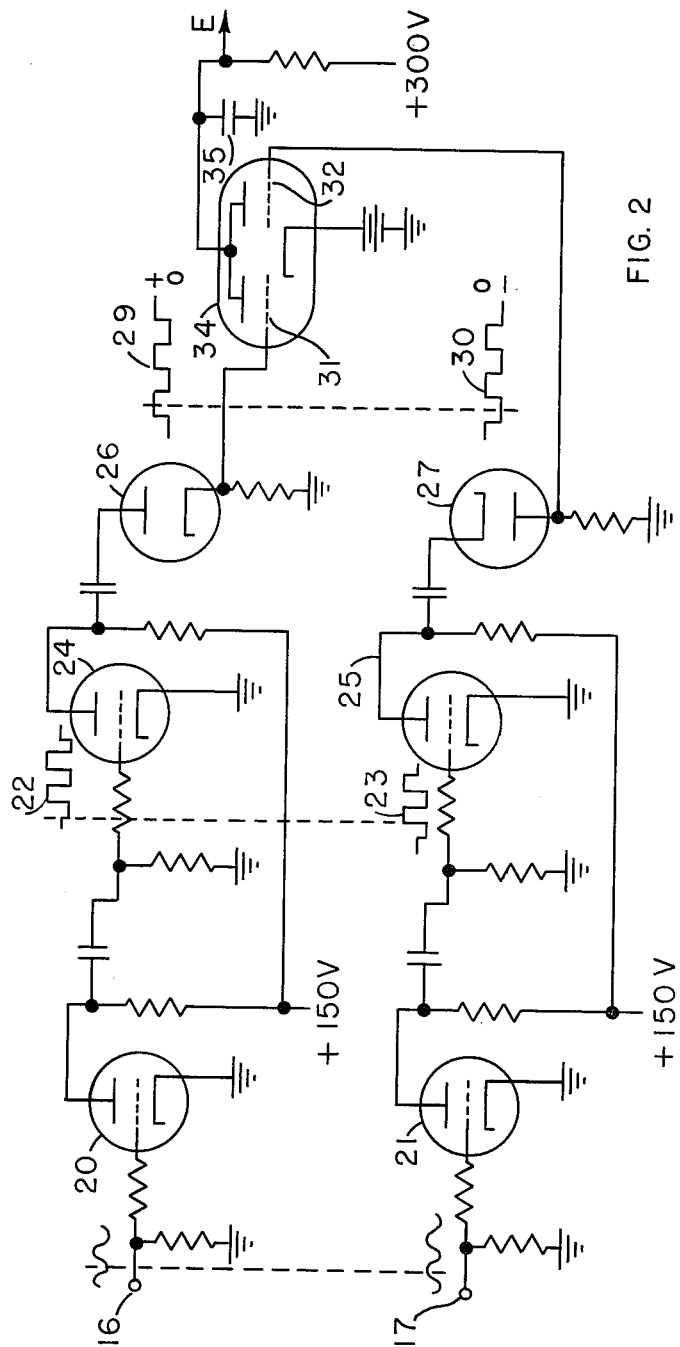
FIG. 2 is a circuit schematic of the phase comparator of FIG. 1.
Figure 3:
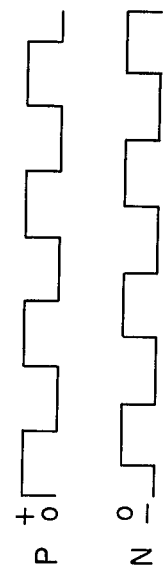
Figure 4:
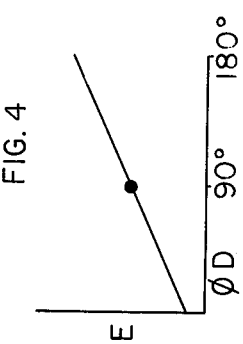
Figure 6:
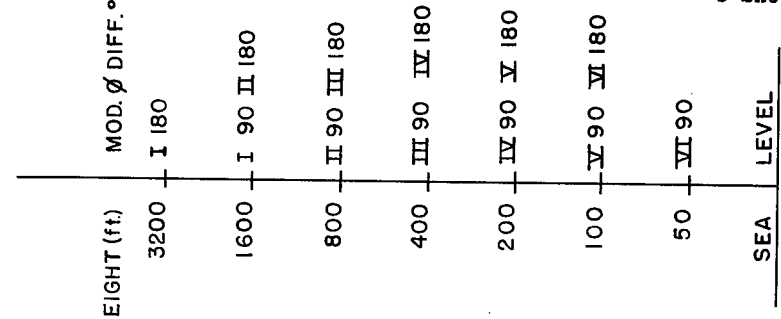
Figure 5:
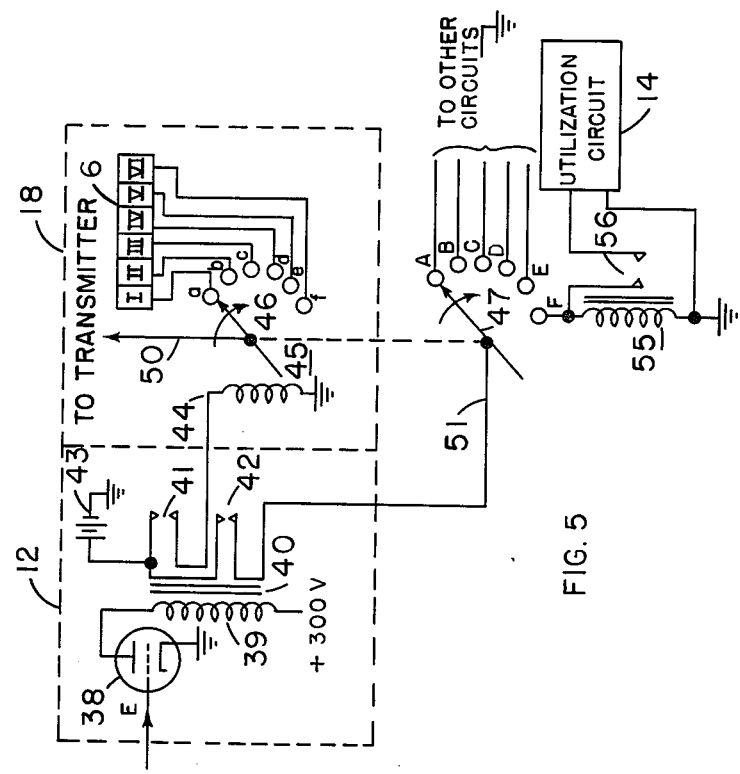

FIGS. 3 and 4 diagrammatically illustrate wave forms in the circuit of FIG. 2 and the output voltage therefrom;

FIG. 5 depicts, in part schematically, the operation of the selector control and modulation selector of FIG. 1; and FIG. 6 illustrates the sequence of events in a descent towards sea level.

In all figures like elements are designated by like numerals or letters.

Referring to FIG. 1, 5 designates a transmitter in which is generated a continuous electromagnetic wave of suitably high frequency, 100 megacycles for example. Of modulators I through IV in modulator bank 6, one after another is selected as is later explained to modulate the amplitude of the wave generated in transmitter 5. The wave so modulated is radiated by transmitting antenna TA toward the surface of the sea. At substantially the same instant, the modulating wave is applied as one input to phase comparator 7. The reflected wave is received by antenna RA and passes with suitable amplification through receiver 8 to demodulator 9. The output of demodulator 9 is applied as a second input to phase comparator 7. It is the same in character as the modulating wave, but differs therefrom in phase by an amount dependent on the height above sea level.

The modulating frequencies differ by octaves, the lowest being that of modulator I which is applied to transmitter 5 at such a height (estimated or measured by any known means) that the phase difference between the transmitted and reflected waves is approximately 180 degrees. For example, at 3200 feet elevation the appropriate frequency of modulator I is 153.8 kc. As the airplane descends, the phase difference falls to 90 degrees at 1600 feet and modulator II automatically replaces modulator I. For modulator II of frequency 307.6 kc., the phase difference at 1600 feet is 180 degrees and falls to 90 degrees at 800 feet. If six modulators differing by octaves in frequency are used, the last of these will be operative from 100 feet and the transmitted and reflected waves will differ 90 degrees in phase of modulation at 50 feet elevation. It will be recognized that for modulator I a change of 90 degrees in phase difference corresponds to a change of 1600 feet in elevation, while for modulator II only 800 feet change is needed. Thus, it is clear that for a given precision in measurement of phase difference, the accuracy of range indication doubles with each doubling of modulation frequency.

The output of phase comparator 7 is applied via line 10 to selector control 12 which will effect, as presently to be described, the change in modulator by modulation selector 18 and the operation of such range indicators as may be included in addition to utilization circuit 14. It will be understood that range indication at intermediate ranges may be omitted, and any practicable number of modulators may be used.

The sequence of events above outlined is shown graphically in FIG. 6 where the height H is divided logarithmically and the phase differences are stated at each range for the replaced and the replacing modulator.

In FIG. 1, numerals 16 and 17 designate the inputs to phase comparator 7 from modulator selector 18 and demodulator 9 respectively.

Referring now to FIG. 2, the transmitter modulation voltage at 16 is applied to the control grid of triode 20 while the demodulated voltage from the receiver is similarly applied at 17 to triode 21. In the circuits of these tubes and succeeding tubes 24 and 25 the respective waves, initially sinusoidal, are amplified and clipped to provide square wave signals 22 and 23, respectively. The condition illustrated in FIG. 2 is that of 180 degrees phase difference between the transmitted and reflected waves. This is the case when any modulator is first applied to the transmitter.

Beyond tubes 24 and 25, respectively, are rectifiers 26 and 27; the former is a positive, the latter a negative, output rectifier. The resulting wave shapes 29 and 30 are opposite in phase. They are applied one to grid 31, the other to grid 32, of double triode 34 of which the anodes are joined. Under these conditions, tube 34 is cut off and its anode voltage is a maximum. Ripples in anode voltage are suppressed by filter condenser 35 so that voltage E is effectively a direct voltage.

FIG. 3 shows diagrammatically to a larger scale than in FIG. 2 the square wave signals to grids 31 and 32 when their phase difference is 90 degrees. This occurs for any modulator when the carrier reaches half the altitude at which that modulator came into operation. It may readily be arranged that the smoothed voltage E decreases substantially linearly with phase difference as in FIG. 4, from a maximum when the phase difference is 180 degrees to a minimum when that difference is zero. It is further arranged in the control circuit now to be described that the value of E occurring at 90 degrees phase difference is that suited to operate selector control 12 and effect the changes of modulators and of range indicating circuits (if such are used) together with utilization circuit 14.

In the circuit shown in FIG. 5, voltage E is applied to the control grid of triode 38 included in the dashed rectangle identified as selector control 12. In the anode circuit of triode 38 is included winding 39 of relay 40 which is provided with two sets of contacts 41 and 42, those of each set being normally closed but held open when the relay is energized by current in its winding. This current flows as long as triode 38 passes current and no current from battery 43 can reach winding 44 of stepping relay 45.

Current in triode 38 ceases when the grid voltage E falls to the cut off value. This occurs when the voltages on grids 31 and 32 of tube 34 differ 90 degrees in phase. Relay 40 then releases, contacts 41 and 42 close and current flows from battery 43 over contacts 41 to operate relay 45. This relay is of a conventional type arranged to advance arms 46 and 47, on the same shaft, one step for each current pulse in its winding. Over contacts 42 battery voltage is also applied by conductor 51 to arm 47 and so to one of terminals A–F which individually correspond to terminals a–f, reached successively by arm 46.

Thus when the initial range is halved arm 46 moves from a to b, connecting thereby over conductor 50 modulator II to transmitter 5 in place of modulator I. At the same time, the battery connection to terminal A is shifted to terminal B. At successive halvings of the range there occur successive replacement of modulators and whatever circuits may be connected to terminals A–F. There may or may not be signal circuits connected to terminals A–E, but utilization circuit 14 at least will be connected to terminal F through relay 55.

On the assumption that modulator I is applied, manually or otherwise, over conductor 50 to transmitter 5 when the height above sea level is 3200 feet, terminals f and F will be reached by arms 46 and 47, respectively, when the height is 100 feet. Then when the height decreases to 50 feet, tube 38 is cut off for the last time and battery flows through the winding of relay 55. Contacts 56 close and apply the battery voltage to utilization circuit 14. This circuit may be of any desired character adapted to effect any desired change in operation of the airplane (or of the ship if the invention is used in surface navigation).

It will be understood that one may choose if desired other phase differences than 90 degrees and other ratios than 1/2 and 2 for changes in range and modulation frequency, respectively, it being required only that modulation frequency change in the inverse ratio to the change in range at each operation. Likewise, it will be apparent that modulator I may be applied at any convenient range from 1600 to 3200 feet.

I claim:

1. A range determining system comprising means for generating a continuous wave of desired frequency, a plurality of modulation generators of logarithmically related frequencies, means for applying one of said generators to modulate the amplitude of said wave, means for radiating the modulated wave, means for receiving the radiated wave after reflection from a surface, means for demodulating the reflected wave, means for comparing in phase of modulation the radiated and reflected waves and means responsive to a prescribed phase difference for replacing the applied generator by the generator next higher in frequency at each recurrence of the prescribed phase difference until the generator of highest frequency is applied.

2. A system as in claim 1 including a utilization circuit and means for actuating said circuit on the occurrence of the prescribed phase difference following application of the last named generator.

3. A range indicating system for a vessel approaching a danger comprising means for generating a continuous wave of desired frequency, a plurality of modulators of frequencies differing by octaves, means for applying the modulator of lowest frequency to modulate in amplitude the generated wave, means for directing the modulated wave to be reflected from the danger, means for receiving and demodulating the reflected wave, means for comparing in phase of modulation the directed and the reflected waves, means controlled by the comparing means on the occurrence of a 90 degrees phase difference between the compared waves to replace the applied modulator by the modulator of next higher frequency and similarly operative on each recurrence of said phase difference until the modulator of highest frequency is applied and a utilization circuit operative on the next occurrence of said phase difference to indicate a range from the danger equal to $V/8f$, where $V$ is the velocity of the wave and $f$=the frequency of the last applied modulator.

4. In a range indicating system means for generating a continuous wave of desired frequency, means for modulating in amplitude said wave at a lower frequency, means for directing the modulated wave toward a reflecting surface, means for receiving and demodulating the reflected wave, means for comparing the waves in phase of modulation and means responsive to a 90 degree phase difference between the waves for doubling the frequency of modulation.

5. A range indicating system comprising means for generating a continuous wave of desired frequency, a plurality of modulators of logarithmically related frequencies lower than the desired frequency, a like plurality of indicating circuits, means for applying initially the modulator of lowest frequency to modulate in amplitude the generated wave, means for transmitting the modulated wave toward a surface of which the range is to be indicated, means for receiving the wave reflected from the surface, means for comparing in phase the direct and reflected modulations and means responsive to the phase comparing means to actuate on the occurrence of a prescribed phase difference the first indicating circuit and simultaneously therewith to replace the applied modulator by the modulator of next higher frequency, said responsive means being similarly operative at each recurrence of the prescribed phase difference to actuate successively the other indicating circuits and to replace the then active modulator by the one of next higher frequency.

6. A range indicating system as in claim 5 in which the last actuated indicating circuit comprises a utilization circuit for the performance of any desired operation.

7. A range-indicating system comprising means for modulating at a known frequency a continuous electromagnetic wave of radar frequency, means for radiating the modulated wave toward a reflecting surface, means for comparing in phase modulation the radiated and reflected waves, an indicating circuit including means for increasing by a known factor the frequency of modulation on each successive occurrence of a prescribed phase difference in modulation for actuating the indicating circuit, thereby to indicate a range from the surface equal in feet to $$\phi V/720F$$

where $\phi$ is the prescribed phase difference in degrees, F is the modulation frequency in cycles per second, and V is the velocity of the waves in feet per second.

References Cited by the Examiner
UNITED STATES PATENTS

| | | | |
|---|---|---|---|
| 2,147,810 | 2/39 | Alford | 343—12 |
| 2,248,727 | 7/41 | Strobel | 343—12 |
| 2,493,097 | 1/50 | Wolff | 343—15 |

CHESTER L. JUSTUS, *Primary Examiner.*

NORMAN H. EVANS, *Examiner.*